April 22, 1930.　　　H. W. GOETZ ET AL　　　1,755,986
ROD SPIDER
Filed Dec. 24, 1927　　　4 Sheets-Sheet 2

INVENTOR.
Herbert W. Goetz
Ralph C. Clark
BY
R. W. Brunt
ATTORNEY.

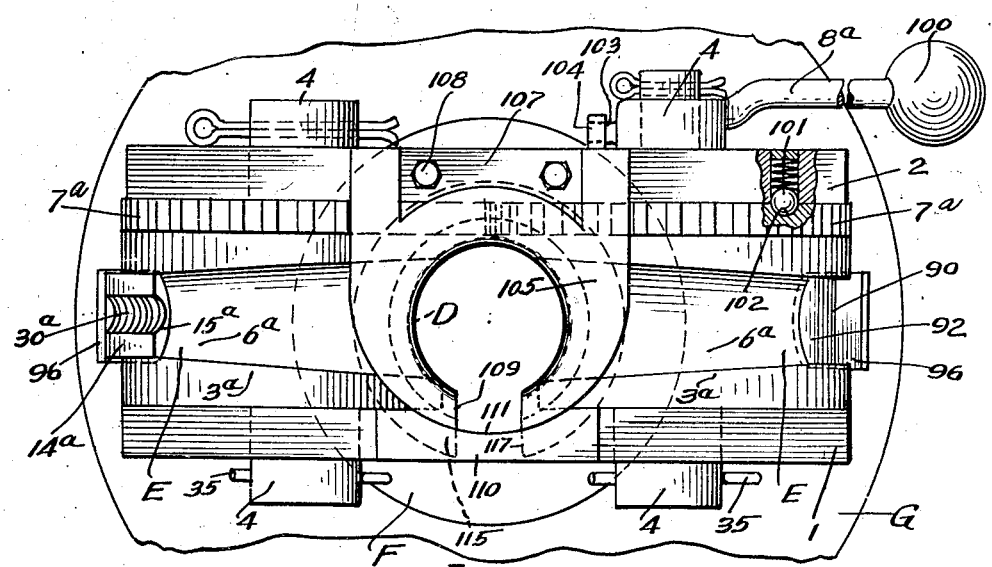
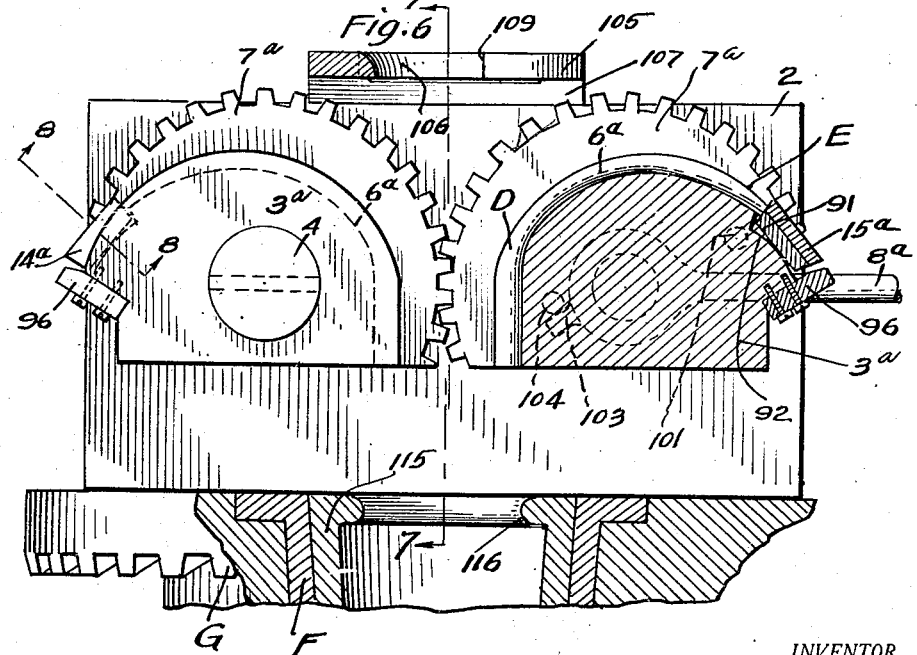

April 22, 1930.  H. W. GOETZ ET AL  1,755,986
ROD SPIDER
Filed Dec. 24, 1927   4 Sheets-Sheet 4
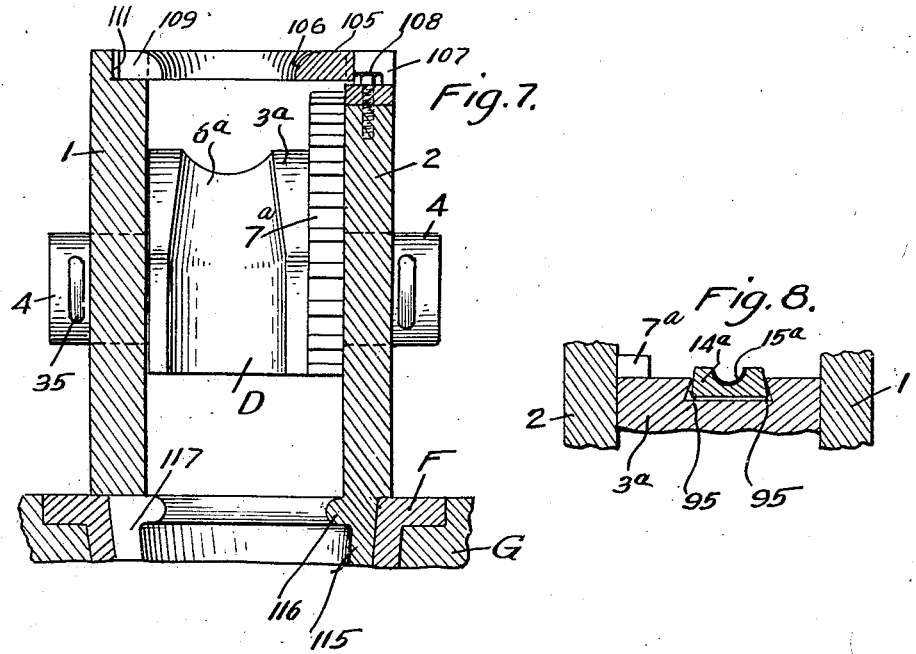
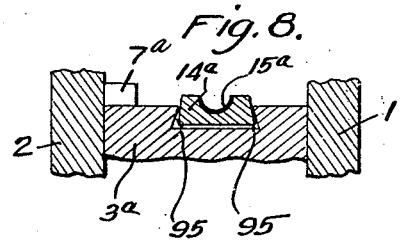
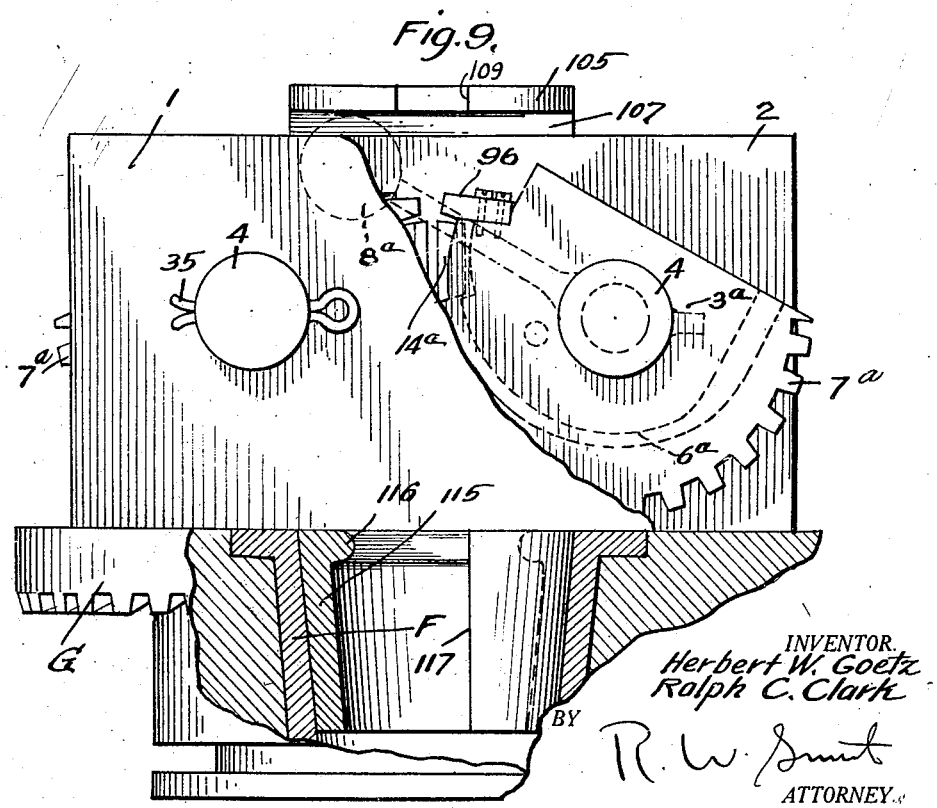
INVENTOR.
Herbert W. Goetz
Ralph C. Clark
BY
ATTORNEY Patented Apr. 22, 1930

1,755,986

UNITED STATES PATENT OFFICE

HERBERT W. GOETZ, OF ALHAMBRA, AND RALPH C. CLARK, OF LOS ANGELES, CALIFORNIA, ASSIGNORS OF ONE-THIRD TO JOHN J. FERLIN, OF LOS ANGELES, CALIFORNIA

ROD SPIDER

Application filed December 24, 1927. Serial No. 242,450.

This invention relates to deep well derrick tools, and more particularly to spiders used in pulling or holding strings of drive pipe, casing, tubing, drill pipe, sucker rods, or the like; the invention being readily adapted for use in connection with either casing, tubing, rods, etc., by making the spider of the proper size and providing the proper mounting for the same, so that the expressions "rod" and "rod spider" as used in this specification will be understood to refer to a spider adapted for holding a string of rods or any other tools or piping such as ordinarily used in wells, without in any way limiting the invention to a spider or clamp for sucker rods only.

With this understanding of its scope, it is the object of the invention to provide a spider which may be readily engaged and disengaged, and which when in operative position provides a positive gripping engagement for supporting a rod, with the weight of the rod exerting extremely efficient leverage for maintaining the gripping engagement.

It is a still further object of the invention to readily engage or release the gripping means by a manually controlled lever having a geared operating connection whereby it may be shifted by the exercise of but little force, and to also provide for releasably retaining the mechanism in inoperative as well as operative position, so that with the spider released, the rods may be conveniently raised and lowered for withdrawal or insertion in the well.

It is a still further object of the invention to properly center the rods in the subsequently engaged gripping means, and to also provide a guard for eliminating the possibility of the rods striking and chipping the edges of the gripping means as the rods are lowered in a well.

It is a still further object of the invention to provide a spider which may be readily laterally shifted onto a rod, but which when in operative position with the rod centered therein provides a completely closed annulus surrounding the rod so as to insure adequate bracing of the entire spider and thus provide a rigid and sturdy construction.

It is a still further object of the invention to provide an attaching means for the spider whereby it may be readily fixed in operative position on a suitable support, the arrangement being such that without the necessity for altering the spider structure it may be manufactured with any one of various attaching means adapting it for readily removable mounting on either casing, tubing, rotary tables, etc., depending upon the use to which the spider is to be put.

Further objects of the invention will be readily understood from the following description of the accompanying drawings, in which:

Fig. 4 is an end elevation of the construction as shown in Fig. 3.

Fig. 5 is a view similar to Fig. 1 but showing a modified construction adapted for mounting on a rotary table with the spider adapted to grip and support rotary drill pipe.

Fig. 6 is a view similar to Fig. 2, showing the same modified construction.

Fig. 7 is a vertical section on the line 7—7 of Fig. 6.

Fig. 8 is a detail section on the line 8—8 of Fig. 6.

Fig. 9 is a view similar to Fig. 6 with the front supporting plate partly broken away and the gripping devices in operative position.

The spider structure includes front and rear vertical supporting plates 1 and 2 with the gripping mechanism mounted between the same, and with a guard supported on top of rear plate 2 and a supporting attachment for the structure depending from the rear plate.

Figure 2:
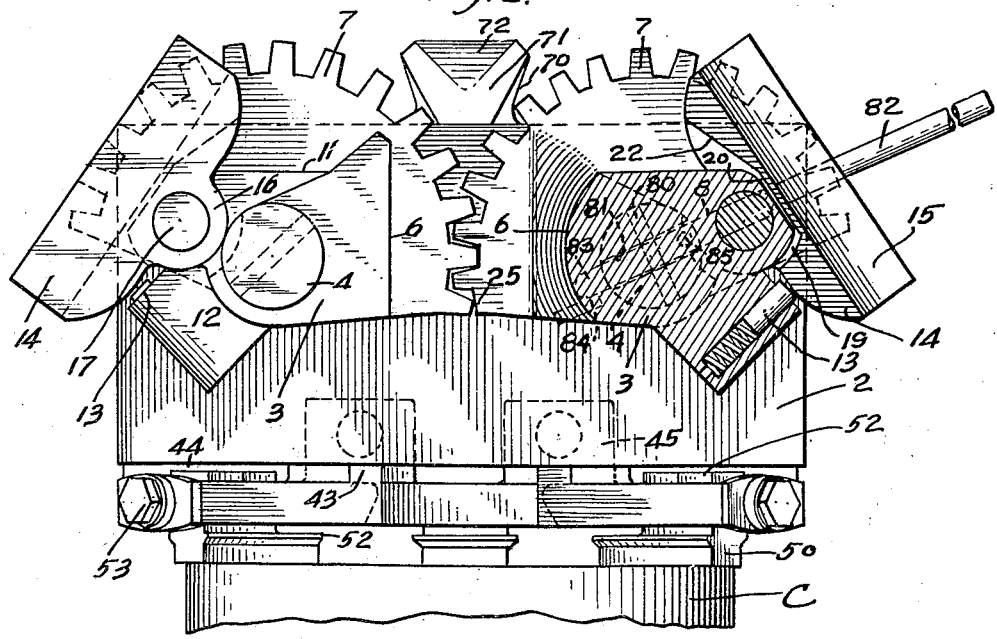
Fig. 2 is a front elevation of the same construction showing the spider in inoperative position with the front supporting plate removed and one of the gripping devices in vertical section.

The gripping mechanism comprises a pair of rotatable members 3 having axial shafts 4 projecting from the respective faces of the same and journaled in bearings 5 in plates 1 and 2 so that the rotatable members are adapted to turn on horizontal axes equi-distantly spaced at opposite sides of the vertical center line of the spider as shown in Fig. 2.

The members 3 are preferably provided with tangential guide surfaces having circumferential grooves 6; and segmental gears 7 are provided at the rear of the members 3. The segmental gears are concentric with shafts 4 and are in meshing engagement so that the rotatable members are dependently oppositely rotated by turning one of said members; and a hand lever 8 is fixed to the projecting end of one of the shafts 4 in back of rear plate 2 for thus manually turning the pair of rotatable members.

Bearing bosses 10 project from the members 3 medially of their width and approximately diametrically opposite the grooves 6, and flat abutment surfaces 11 form continuations of these bosses extending toward the upper ends A of the grooves 6. A lug 12 projects from each of the members 3 at one side of the boss 10 and carries a spring projected pin 13 for limiting swinging movement of a gripping jaw 14 which straddles the boss 10 and is pivoted thereto.

The jaws 14 are elongated plates having straight grooves 15 in their upper faces, and bearing lugs 16 depend from the jaw plates at their respective sides and medially of their length. The bearing lugs 16 straddle the bosses 10 and pivot pins 17 extend through alined bearing openings in the lugs and bosses so that the jaws 14 are adapted for swinging movement on the rotatable members 3.

In order to permit free swinging of the jaws the surfaces of members 3 are recessed beyond the side edges of bosses 10 to provide bearing grooves 18 adapted to receive the lugs 16, and the undersides of the jaws are recessed medially of their length to form bearing grooves 19 cooperating with the outer peripheries of bosses 10 which are preferably also recessed medially of their width to form bearing grooves 20.

Figure 3:
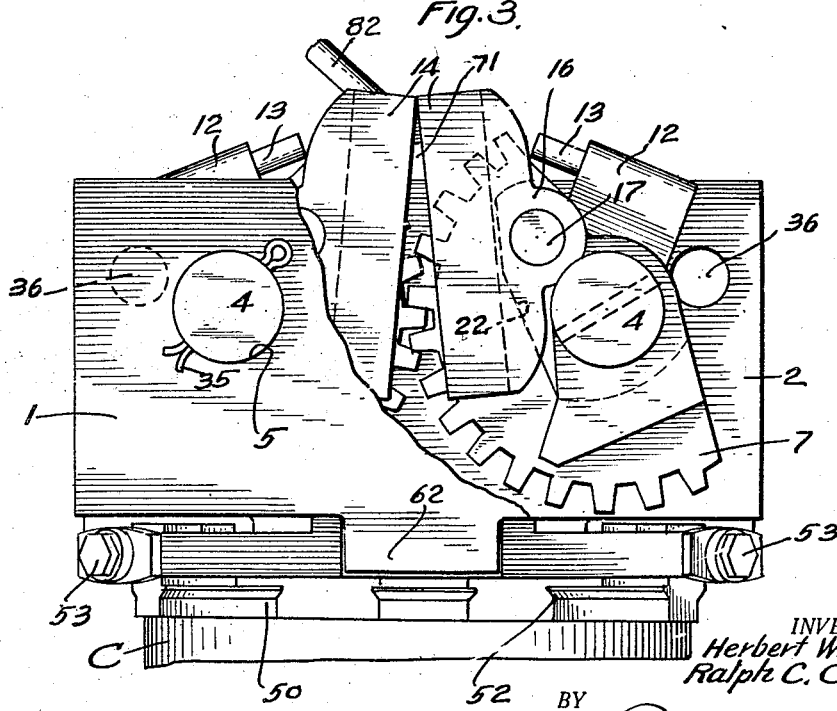
Fig. 3 is a similar view with the front supporting plate broken away and the gripping devices in the position they assume as they move toward operative position.

The jaws 14 are limited in their swinging movement away from one another by the spring projected pins 13 which are adapted to yield when the weight of the jaws swing them outwardly after passing beyond dead center as shown in Fig. 2; and when the members 3 are rotated toward one another the spring projected pins 13 swing the jaws inwardly as soon as they pass beyond dead center as shown in Fig. 3. This inward swinging movement of the jaws is limited by abutment of their undersides against the flat abutment surfaces 11, and in order to provide for the desired swinging movement of the jaws the forward ends of their undersides which engage the abutment surfaces 11 are preferably recessed to form inclined abutment surfaces 22.

Figure 1:
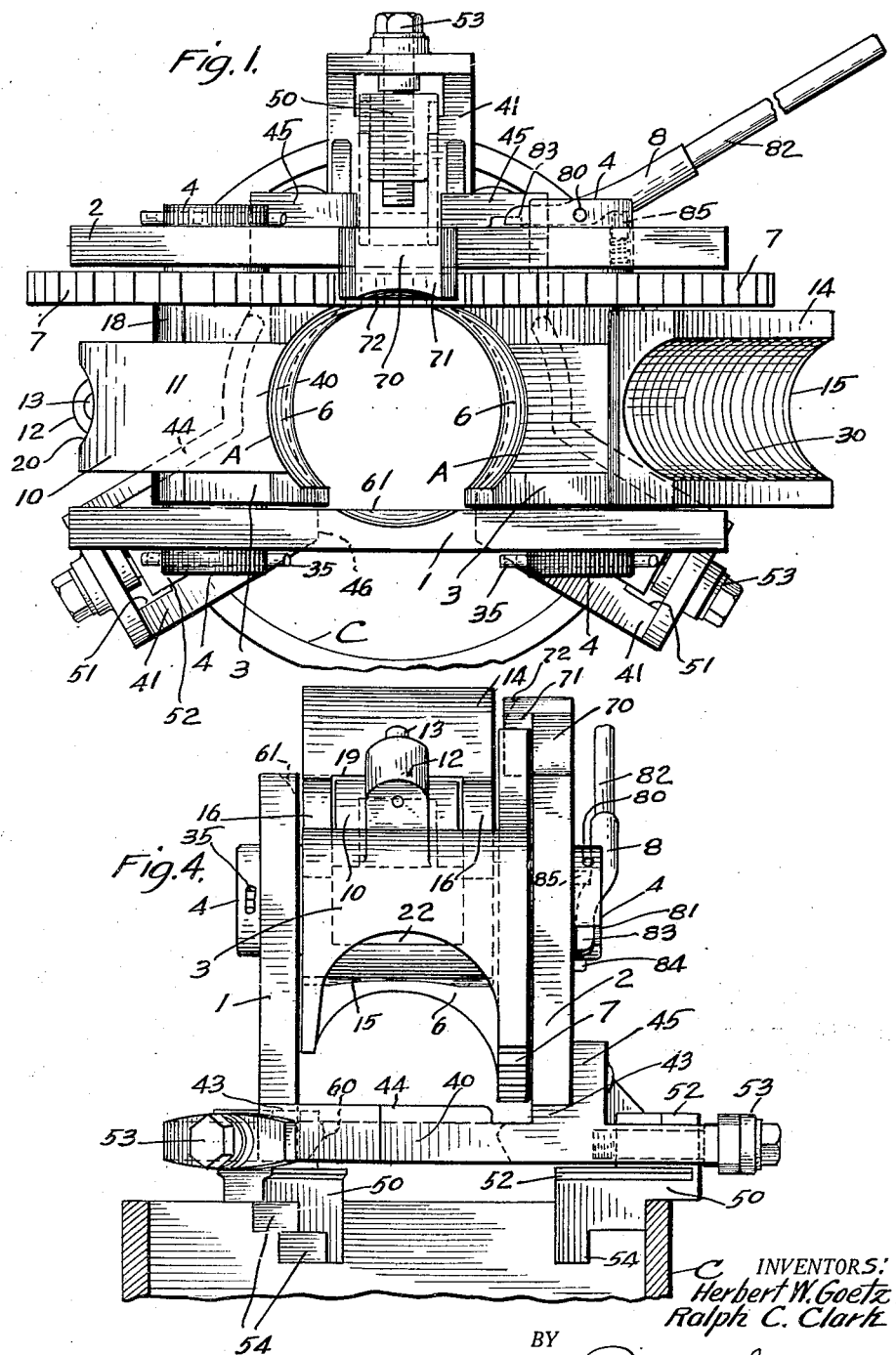
Fig. 1 is a top plan view of a construction embodying the invention and particularly adapated for mounting on well casing for holding well tubing, the spider being shown in inoperative position with one of the jaws removed.

The rotatable members 3 are limited in their swinging movement away from one another so that their tangential guide surfaces assume substantially upright and parallel relation as shown in Fig. 2, and the cooperating grooves 6 of the guide surfaces thus define an annulus of enlarged diameter as shown in Fig. 1, which is adapted for free sliding reception of the rod or tubing which is to be gripped by the spider. The means for so limiting swinging movement of members 3 may comprise an abutment 25 on one of the gears 7 adapted for impingement by the last tooth of the cooperating gear so as to bind the gears against further meshing engagement.

When the rod, tubing, or the like which is to be gripped by the spider has been loosely received in the annulus defined by grooves 6, the rotatable members 3 are turned toward one another by operating the lever 8, and when the jaws 14 pass beyond dead center they are swung forwardly by the spring projected pins 13 so that the rear ends of the cooperating jaws abut against one another when the forward ends of the jaws are still spaced apart as shown in Fig. 3. Since the jaws 14 are mounted on pins 17 which are eccentric to the axes of members 3, this swinging movement of the rotatable members 3 will contract the gripping jaws on the rod or tubing, and after said initial abutment of the rear ends of the cooperating jaws against one another, continued turning movement of members 3 will swing the jaws rearwardly on their pivots 17 and against the projecting tendency of pins 13, until the jaws assume a parallel position gripping the rod or tubing throughout the length of the jaws. The gripping faces of the jaws may be serrated as shown at 30 so as to positively grip the rod or tubing, and continued turning movement of members 3 will tightly bind the gripping jaws against the rod or tubing to insure a positive support for the same. By initially engaging the rod or tubing at the rear ends of the gripping jaws, which are adapted to yield as the gripping pressure is increased and until the jaws assume parallel position, there is no possibility of excessive pressure being applied to the rod or tubing at any one point, and the gripping pressure is uniformly applied throughout the length of the jaws for supporting the rod or tubing without the liability of distortion.

The front supporting plate 1 is readily removable to permit replacement of jaw plates 14 when they have become worn and to allow for conveniently mounting the spider on tubing, casing or the like so as to encircle the string of rods, pipe or tubing which is to be engaged thereby. For this purpose front plate 1 may be fixed on the projecting shafts 4 by means of cotter pins 35 which are readily withdrawn to permit removal of the front plate, and when the front plate is removed the pivot pins 17 may be disengaged by forcing them outwardly through holes 36 in the rear plate 2, the said holes being so positioned as to aline with pivot pins 17 when the gripping devices are swung outwardly to inoperative position, and the withdrawal of the pivot pins releasing the jaw plates 14 so as to permit their removal and replacement.

The rotatable members 3 are transversely spaced at the forward edge of their tangential guide surfaces as shown in Fig. 2, so that when the rotatable gripping devices are swung outwardly to inoperative position and the front plate 1 is removed, the spider may be readily laterally shifted onto a string of drill pipe, rods or tubing, with the string of rods passing between the spaced rotatable members so as to be loosely received in the cooperating grooves 6; and with the parts so positioned the spider is adapted for mounting on the casing or tubing through which the string of rods extends, so that by then replacing the front plate 1 the string of rods is completely encircled by the spider.

The supporting attachment whereby the spider is mounted on casing or the like, projects forwardly from the lower edge of rear plate 2, and is shown as an annulus 40 having radial arms 41, with the plates 1 and 2 adapted to rest upon supporting ribs 43 which are preferably connected by strengthening ribs 44. The rear plate 2 is permanently fixed on its supporting ribs 43, preferably by riveting the rear plate to suitable attaching lugs 45, and the front plate simply rests upon its supporting ribs so that by removing the front plate as previously described, the spider may be shifted laterally onto a string of tubing with the string passing through a split 46 in the front of the annulus 40.

The support for the spider is adapted for detachable mounting on the casing, tubing, or the like, and for this purpose the arms 41 are provided with depending clamping blocks 50 adapted for radial adjustment along the arms so as to expand against the inner wall of casing or tubing shown at C, and thereby clamp the spider in place. The blocks 50 slide in slots 51 which are provided in arms 41, and are formed with suitable guide lugs 52 for maintaining assembled relation of the parts; and the blocks may be independently shifted to clamping position centering the spider on the string of rods, by means of adjusting screws 53, the blocks being preferably provided with a plurality of faces 54 defining annuli of different diameters, so that by engaging casing C by the different clamping faces the support for the spider is adapted for use on casing and tubing of different size.

The inner periphery of the annulus 40 is preferably beveled as shown at 60 so as to guide the string of rods or the like as it is raised and lowered, and the provision of circumferential grooves 6 in the guide surfaces of members 3 provides a similar means for properly centering the string of rods with relation to the spider. The upper edge of front plate 1 may be cut away as shown at 61 in order to form a continuation of the tapering guide defined by grooves 6, and a lug 62 preferably depends from front plate 1 so as to close the split 46 in the supporting attachment when the spider is mounted on a string of rods.

A guard preferably projects forwardly from rear plate 2 above the gears 7 so as to further insure proper centering of the string of rods and positively prevent its striking and chipping the gears 7 as it is lowered through the spider. This guard is shown as a block 70 projecting upwardly from rear plate 2 medially of its width, and this block projects forwardly as shown at 71 into the space above and between the gears 7, with the upper edge of the projection preferably cut away as shown at 72 in order to provide a beveled guide for the string of rods.

The lever 8 whereby the gripping devices are swung to operative or inoperative position may be provided with releasable locking means for positively retaining the gripping means in inoperative position, and for this purpose the lever 8 is shown as pivotally mounted on a pin 80 extending transversely through the end of one of the shafts 4 which projects rearwardly beyond the plate 2, and the lever 8 is adapted to rock in a diametrical slot 81 in said projecting end of shaft 4. A handle 82 projects from one end of the lever and its opposite end forms a latch 83 projecting beyond slot 81 and cooperating with a lug 84 on the rear plate 2. A spring projected pin 85 which is mounted in shaft 4 engages the lever 8 and yieldably rocks the lever on its pivot pin 80 so that when the gripping devices 3 are swung open the latch 83 engages in back of lug 84 for locking the gripping devices in open position. When it is desired to swing the gripping devices to operative position the lever 8 is swung on its pivot pin 80 against the projecting tendency of pin 85, thereby disengaging latch 83 from lug 84 so that by arcuately swinging the lever 8 the gripping devices 3 are rotated to operative position as previously described.

In the modification of the invention shown in Figs. 5 to 9 the spider is adapted for use in connection with a string of rods or the like which is of restricted diameter, the modified construction being particularly applicable to sucker rods or drill pipe, while the form of the invention shown in Figs. 1 to 4 is more applicable to well tubing. The modified construction also shows a supporting attachment for the spider whereby it is particularly adapted for mounting on a rotary table for use in connection with rotary drill pipe.

In the modified construction the members 3ª preferably comprise segmental arcs forming peripheral guide surfaces and provided with the circumferential grooves 6ª and the meshing gears 7ª. The circumferential grooves 6ª are eccentric to shafts 4 as shown in Fig. 6 so that ends D of the grooves, which will be called the inner ends, are appreciably transversely spaced when the rotatable members are turned to inoperative position as shown in Fig. 6, while ends E of the grooves, which will be called the outer ends, are but slightly transversely spaced when the rotatable members are turned to operative position. The inner ends D of the circumferential grooves are preferably cut-away as chords of their arcs to form straight grooves which will extend vertically when members 3ª are in inoperative position, and when in this position the cooperating groove ends D define a circumference of appreciably greater diameter than that of the rod which is to be supported by the spider.

From their ends D the grooves 6ª preferably taper to reduced width toward their opposite ends E as shown in Fig. 5, and the outer ends E of the grooves are preferably recessed as shown at 90 for reception of jaw plates 14ª having flat bases 91 adapted to rock lengthwise of grooves 6 on arcuate bases 92 of the recesses.

The jaw plates have straight grooves 15ª extending their length and preferably transversely serrated as shown at 30ª so that when members 3ª are turned to operative position, the rod which extends through the spider for support thereby is gripped in the cooperating serrated grooves 15ª with the jaw plates 14ª rocking to exactly parallel relation so that the gripping action is maintained along the entire length of the jaws.

The jaw plates 14ª are preferably releasably held in recesses 90 so that they may be readily replaced when worn, and this releasable engagement is obtained by correspondingly dove-tailing the edges of the jaw plates and the sides of recesses 90 as shown at 95, so that the jaw plates may be slipped into the outer ends of the recesses by first removing the detachable abutment plates 96, and will then be held against dislodgement by their dove-tail engagement and by replacement of plates 96 which are adapted to overlie the ends of the jaws as shown in Fig. 6. The dove-tail engagement 95 is not a snug fit but as shown in Fig. 7 provides sufficient play to permit rocking of the jaws to assume their parallel gripping position.

The means for preventing the rotatable members 3ª from swinging open beyond the point where groove ends D are in parallel relation may comprise a projection 103 on lever 8ª adapted to engage a stop 104 on rear plate 2. The rotatable members are then releasably held in inoperative position by a counterweight 100 on lever 8ª tending to prevent reverse turning movement of the gripping means, and if desired the members 3ª may be positively locked in inoperative position by means of a yieldably projected ball catch 101, on rear plate 2 adapted to seat in a cooperating recess 102 in one of the members 3ª.

The guard which is supported on rear plate 2 is a split guide annulus 105 having a bore of slightly less diameter than that of the circumference defined by cooperating groove ends D, and the wall of said bore is preferably curved to form a guide lip 106. This split annulus may be an integral part of a block 107 which is fixed on rear plate 2 by means of bolts 108, the annulus being spaced slightly above and concentric with the circumference defined by groove ends D, with the split 109 of the annulus positioned medially of the front of the spider as shown in Fig. 5. The front plate 1 preferably has a lug 110 projecting above the same in horizontal alinement with annulus 105 and having a curved surface 111 fitting against the annulus to close its split 109 as shown in Fig. 5.

The attaching means for supporting the spider is shown as adapting the spider for mounting on a rotary table so that it may be used for holding drill pipe; and for this purpose an annulus 115 projects from the base of plate 2 and is of a diameter to fit in the master bushing F of a rotary table G, with the annulus flanged as shown at 116 and tapering in accordance with the taper of the master bushing so as to fit snugly therein. The annulus and its flange are split as shown at 117 so that when front plate 1 is removed the spider may be mounted on a string of drill pipe extending through rotary table G, and the front plate may be then replaced and the spider firmly supported on the rotary table by the flanged annulus 115 seating in bushing F.

We have thus provided a simple but extremely practical spider for supporting tubing, rods, drill pipe and the like, the spider being formed with a suitable supporting attachment whereby it may be mounted on casing, tubing or a rotary table; and the spider being constructed of the proper size to adapt it to grip either well tubing of relatively large diameter, or rods and pipe of relatively smaller diameter.

When the rotatable gripping members are in inoperative position their grooved guide surfaces define an annulus adapted to loosely receive the string of tubing, rods or the like which is to be held by the spider, and when the gripping devices are swung to operative position the jaw plates which are eccentrically mounted on the rotatable members cooperate to define an annulus of reduced diameter and which is adapted to snugly engage the string of rods for positively gripping the rods by the cooperating jaws.

The parts are so arranged that this gripping engagement will be at a point above the axes of shafts 4 and consequently the weight of the supported string of rods will exert leverage at the point of gripping engagement and fulcrumed at the axes of the shafts for tightening the clamping action and providing a positively locked support for the rods, and the yieldable rocking mounting provided for the jaw plates insures the jaws assuming parallel relation when in gripping position so that the clamping engagement is throughout the length of the jaws and is not confined to the point of first contact by the jaws.

We claim:

1. A rod spider comprising a support, cooperating gripping members projecting from a vertical face of the support and adapted to release or engage opposite sides of a rod for clamping the latter between the gripping members, attaching means for the spider projecting from the support, the said attaching means having a bore for the rod and being split forwardly from its bore, and a removable plate independent of said attaching means and adapted to overlie the space between the projecting gripping members, the gripping members and the split attaching means being adapted for relative lateral movement of the rod and spider to position the rod between the gripping members when the plate is removed.

2. A rod spider comprising a support, transversely spaced members rotatably mounted on the support, gears on the rotatable members adapted for meshing engagement, the rotatable members having circumferentially grooved peripheral guide surfaces, and a jaw mounted on each rotatable member and adapted for rocking movement circumferentially of its rotatable member, the rotatable members being adapted to turn so that the jaws are spread apart and the grooves of the guide surfaces cooperate to define an annulus of relatively large diameter, and opposite turning of the rotatable members being adapted to position the jaws adjacent one another so as to provide a clamping annulus of appreciably smaller diameter.

3. A rod spider comprising a support, transversely spaced members rotatably mounted on the support and having circumferentially grooved peripheral guide surfaces, and a jaw mounted on each rotatable member and adapted for rocking movement circumferentially of its rotatable member, the rotatable members being adapted to turn so that the jaws are spread apart and the grooves of the guide surfaces cooperate to define an annulus of relatively large diameter, and opposite turning of the rotatable members being adapted to position the jaws adjacent one another so as to provide a clamping annulus of appreciably smaller diameter.

4. A rod spider comprising a support, transversely spaced members rotatably mounted on the support, gears on the rotatable members adapted for meshing engagement, and a jaw mounted on each rotatable member and adapted for rocking movement circumferentially of its rotatable member, the rotatable members being adapted to turn so that the jaws are spread apart, and opposite turning of the rotatable members being adapted to position the jaws adjacent one another so as to provide a clamping annulus.

5. A rod spider comprising a support, transversely spaced members rotatably mounted on the support and having circumferentially grooved peripheral guide surfaces, a jaw mounted on each rotatable member, the rotatable members being adapted to turn so that the jaws are adjacent one another and cooperate to provide a clamping annulus for a rod inserted therebetween, and a guard mounted on the support and adapted to protect the rotatable members against the rod during axial movement of the rod.

6. A rod spider comprising a support, cooperating gripping members mounted on the support and adapted to release or engage opposite sides of a rod for clamping the latter between the gripping members, the rod spider being adapted for lateral shifting to receive a rod between the gripping members, and a guard mounted on the support and adapted to protect the gripping members against the rod during axial movement of the rod.

7. A rod spider comprising a support, cooperating gripping members mounted on the support and adapted to release or engage opposite sides of a rod for clamping the latter between the gripping members, a split attaching annulus for the rod spider projecting forwardly from the support, the rod spider being adapted for lateral shifting to receive a rod through the split in the attaching annulus and position the rod between the gripping members, and a removable plate adapted to overlie the space between the projecting gripping members.

8. A rod spider comprising a support, cooperating gripping members mounted on the support and adapted to release or engage opposite sides of a rod for clamping the latter between the gripping members, a split attaching annulus for the rod spider projecting forwardly from the support, the rod spider being adapted for lateral shifting to receive a rod through the split in the attaching annulus and position the rod between the gripping members, and a removable plate adapted to overlie the space between the projecting gripping members, the plate having an extension adapted to close the split in the attaching annulus.

9. A rod spider comprising a support, cooperating gripping members mounted on the support and adapted to release or engage opposite sides of a rod for clamping the latter between the gripping members, a removable plate adapted to overlie the space between the projecting gripping members, and a guard mounted on the support and adapted to protect the gripping members against the rod during axial movement of the rod.

10. A rod spider comprising a support, rotatable gripping members mounted on the support, gears on the rotatable gripping members adapted for meshing engagement, the rotatable gripping members being adapted to release or engage opposite sides of a rod for clamping the latter between the gripping members, the rod spider being adapted for lateral shifting to receive the rod between the gripping members, and a guard mounted on the support and adapted to protect the gears against the rod during axial movement of the rod.

11. A rod spider comprising a support, transversely spaced members rotatably mounted on the support, a jaw mounted on each rotatable member and adapted for rocking movement circumferentially of its rotatable member, the rotatable members being adapted to turn so that their jaws are adjacent one another and cooperate to provide a clamping annulus, and yieldable means tending to rock the jaws during said turning of the rotatable members so as to cause initial abutment by those ends of the jaws which are remote from one another in the circumferential direction opposite to that of said turning of the rotatable members.

12. A rod spider comprising a support, transversely spaced members rotatably mounted on the support, a jaw mounted on each rotatable member and adapted for rocking movement circumferentially of its rotatable member, the rotatable members being adapted to turn so that their jaws are adjacent one another and cooperate to provide a clamping annulus, and yieldable means tending to rock the jaws during said turning of the rotatable members so as to cause initial abutment by those ends of the jaws which are remote from one another in the circumferential direction opposite to that of said turning of the rotatable members, and opposite turning of the rotatable members being adapted to position the jaws so that they overbalance and retract the yieldable means for oppositely rocking the jaws.

In testimony whereof they have affixed their signatures to this specification.
HERBERT W. GOETZ.
RALPH C. CLARK.